March 6, 1945. F. WALTERS 2,370,894
MULTIPLE THREAD MILLING CUTTER
Filed Oct. 5, 1942
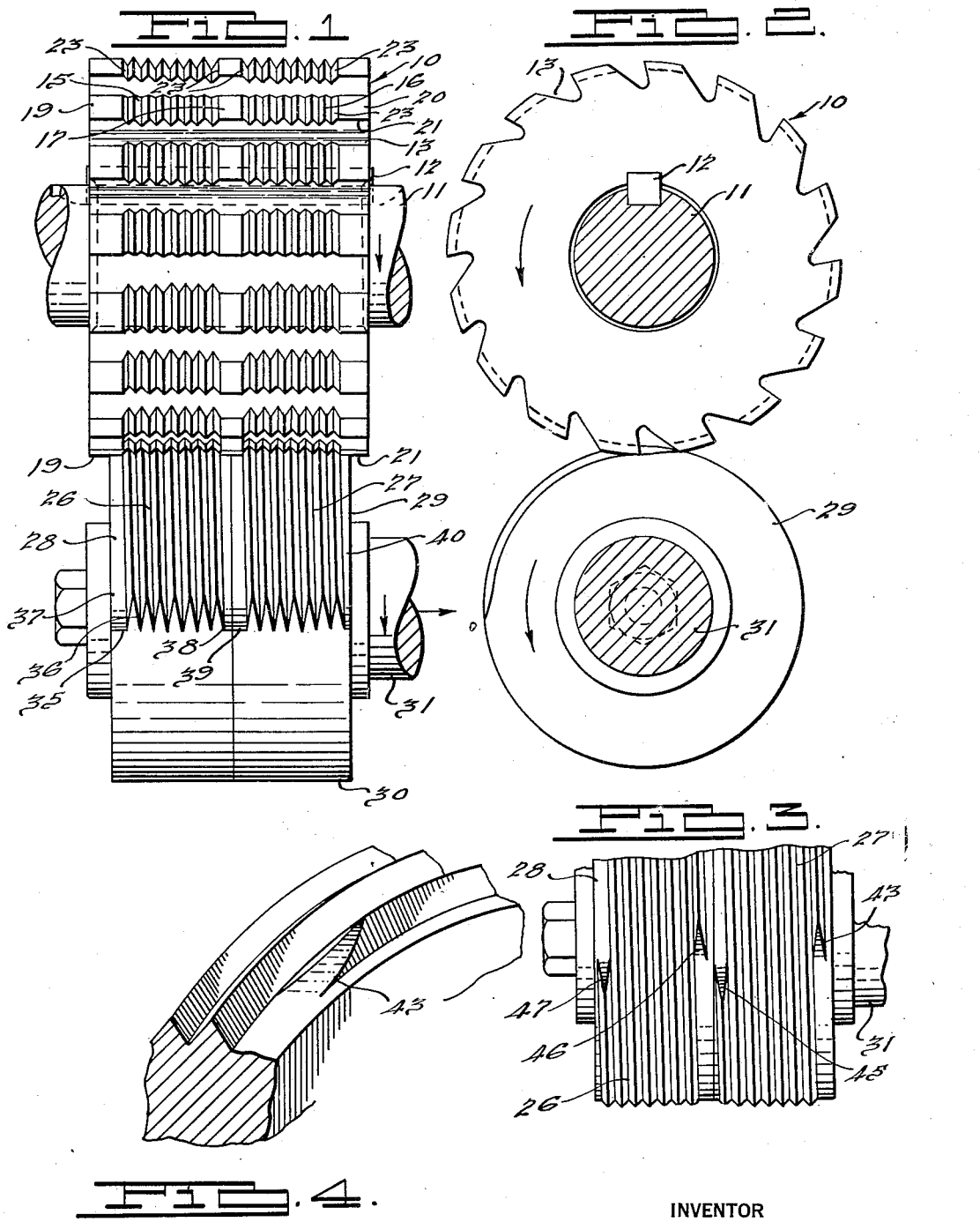
INVENTOR
Fritz Walters
BY
Harness, Dickey & Pierce
ATTORNEYS Patented Mar. 6, 1945

2,370,894

UNITED STATES PATENT OFFICE 2,370,894

MULTIPLE THREAD MILLING CUTTER

Fritz Walters, Detroit, Mich., assignor to Detroit Tap and Tool Company, Detroit, Mich., a corporation of Delaware Application October 5, 1942, Serial No. 460,758

4 Claims. (Cl. 10—154)

The invention relates generally to thread cutting devices and it has particular relation to a multiple thread milling cutter.

One object of the invention is to provide an improved multiple thread milling cutter for cutting threads wherein a complete thread is formed on a workpiece during one revolution of the latter about its own axis.

Another object of the invention is to provide improved thread cutting apparatus which removes or cuts away end portions of the threaded part so as to avoid imperfect thread sections at the starting and leaving ends of the thread.

Another object of the invention is to provide improved thread cutting apparatus which forms an end face on the ends of the thread which is of such character that threading of the workpiece into another part is facilitated and made easier.

Another object of the invention is to provide an improved multiple thread milling cutter which enables obtaining the aforesaid advantages while still allowing the cutting of threads on a plurality of workpieces simultaneously.

Other objects of the invention will become apparent from the following specification, from the drawing relating thereto, and from the claims hereinafter set forth.

For a better understanding of the invention, reference may be had to the drawing, wherein:

Figure 1 is an elevational view showing a cutter as constructed according to one form of the invention, in operative relation to a pair of workpieces upon which threads have partly been cut.

Fig. 2 is an end view of the assembly shown by Fig. 1.

Fig. 3 shows the two workpieces with the finished threads formed thereon.

Fig. 4 is a detailed view on a larger scale, showing the end of one of the threads as formed during the thread cutting operation.

Referring to Figs. 1 and 2, the multiple thread milling cutter is generally indicated by the numeral 10 and is keyed to a rotary shaft 11 by means of a key 12. The outer periphery of the cutter body is provided with circumferentially spaced grooves 13 and, between these grooves, teeth are provided for cutting metal from a workpiece during the thread cutting operation. Each line of teeth between each pair of grooves includes a first series 15 of thread cutting teeth and a second series 16 of similar teeth which are spaced axially from the first series by a cutting tooth 17 having an axially directed cutting edge 21. Similar teeth 19 and 20, having axially directed cutting edges 21, are also provided at the remote ends of the two series 15 and 16.

The cutting teeth 17, 19, and 20 have their advance or cutting edges 21 substantially radially co-extensive with the outer apexes of the thread cutting teeth in the two series 15 and 16, so that such teeth, 17, 19, and 20, will remove metal from the workpiece to a depth equal to the depth of the threads cut on the workpiece. Axially opposite ends of the tooth 17 are inclined as indicated at 23 and such inclined sides are of such shape and so located that they cut the inclined sides of the inner end thread convolutions. Similarly, the end teeth 19 and 20 have sides 23 which cut the tapered sides of the outer end thread convolutions. In connection with Figure 2, it will be observed that the cutter is adaptable for counterclockwise rotation and that the grooves 13 are so formed as to provide properly designed leading cutter edges.

The cutter, shown and described, is adapted to cut helical threads 26 and 27 on workpieces 28 and 29, respectively. Initially, these workpieces have cylindrical peripheries as indicated at 30 in Figure 1, and they may be held together and locked on a shaft 31 which will turn slowly relative to the shaft 11 but in the same counterclockwise direction. At the same time, means (not shown) will be provided to feed the shaft 31 axially, so that during one complete revolution of the shaft, the workpieces are advanced axially a distance equal to that between two threads. With the cutter rotated at a suitably high speed and in the counterclockwise direction, as seen in Fig. 2, and with the workpieces turning slowly in a counterclockwise direction and being fed axially in the direction shown by Fig. 1, helical threads will be formed during one revolution of the shaft 31 as will be understood.

With particular reference now to Fig. 1, the two workpieces are shown as having one quarter of the thread formed, or in other words, the workpieces have turned approximately through one quarter revolution. Initial contact of the cutter with the workpieces forms an arcuate cut having a radius corresponding to that of the cutting edges and this leaves thread end formations as indicated in 36. Cylindrical surfaces 37, 38, 39 and 40, of reduced diameter, are formed by the axial cutting teeth 17, 19, and 20 and as the thread cutting operation continues, the cutting edges 21 on teeth 20, for example, move to the left more and more relative to the workpiece, and when the workpiece has practically completed its one revolution, such edge will be disposed in a position to cut off the end of the thread so as to provide an end face as indicated at 43 in Figs. 3 and 4. This operation not only provides an end face which will facilitate threading another member thereon, but it also serves to cut off any imperfect thread at the end.

At the other end of the workpiece 29, a reverse procedure has occurred. In this instance, the cutting tooth 17 has removed the metal ahead of the tooth forming operation, and when the workpiece has completed a revolution, the end thread cutting tooth cuts through into the open space over the cylindrical surface of reduced diameter indicated at 39. Now, since the end of this surface 39 is curved in accordance with the curvature of the cutter, the end of the tooth will have a curved surface, as indicated at 45 in Fig. 3, which will correspond to the curved surface 43 at the opposite end of the thread. One difference in the two procedures is that any continued rotation of the workpiece after one complete revolution, will cause the cutting edges 21 on teeth 20 to remove more and more of the thread end, whereas at the opposite end 45, as seen in Fig. 3, continued rotation of the workpiece will merely move the thread cutting tooth over a blank space and no change in the end face of the thread will be effected. It might be observed in this connection, that the two ends of the thread thus might be variably separated circumferentially by turning the shaft 31 through part of a second revolution.

The same operation is effected on the workpiece 28 and the two ends of the thread thereon are indicated at 46 and 47 in Fig. 3.

From the foregoing description and the drawing, it will be apparent that complete, helical threads may be formed rapidly and efficiently by means of a cutter constructed according to the invention, and that the ends of the threads may be formed with end faces which will facilitate threading operations. Furthermore, it will be apparent that more perfect thread ends may be obtained, and that, in connection with one end, continued turning of the workpiece and operation of the cutter may be employed to remove more and more of the thread end. Imperfect thread ends thus may be removed. Furthermore, it may be observed that, at the other end of the thread, an imperfect thread end will not be apt to occur, since the thread cutting teeth abruptly run through an arcuate surface and into open space so that the end of the thread normally will have a sharp and accurate formation, due to the fact that the metal previously has been removed.

Moreover, it will be apparent that a plurality of workpieces may be threaded, in the manner described, by using a single multiple thread milling cutter. Additive to this, the workpieces may be identical and the thread formation in one may correspond exactly to that of the other so that duplicate parts may be readily made.

Although only one form of the invention has been illustrated and described in detail, it will be apparent to those skilled in the art that various modifications may be made without departing from the scope of the appended claims.

What I claim is:

1. A multiple thread milling cutter comprising a rotatable body having a series of axially spaced teeth of substantially V-shape and arranged and adapted to cut a helical thread on a workpiece during turning of the latter and feeding thereof axially relative to the cutter, and an end tooth axially next to and beyond one thread cutting tooth, said end tooth comprising an axially extending cutting edge of substantially greater width than said thread cutting teeth radially coextensive with the thread cutting teeth and adapted to cut axially across the thread on the workpieces so as to cut an end face on the thread.

2. A multiple thread milling cutter comprising a rotatable body having a series of axially spaced teeth of substantially V-shape and arranged and adapted to cut a helical thread on a workpiece during turning of the latter and feeding thereof axially relative to the cutter, and an end tooth axially next to and beyond one thread cutting tooth, said end tooth comprising an axially extending cutting edge of substantially greater width than said thread cutting teeth radially coextensive with the thread cutting teeth and having a tapered side surface joining the adjacent tapered side surface of the adjacent thread cutting tooth so as to form a trough corresponding in shape to the thread cut on the workpiece.

3. A multiple thread milling cutter comprising a rotatable body having a series of axially spaced thread cutting teeth arranged and adapted to cut a helical thread on a workpiece during turning of the latter and feeding thereof axially relative to the cutter, and an end cutter tooth at each end of the series, each end cutter tooth having an axially directed edge of substantially greater width than said thread cutting teeth radially coextensive with the thread cutting teeth and so located axially with respect to the latter that they cut transversely across the ends of the thread respectively.

4. A multiple thread milling cutter comprising a rotatable body having two axially spaced series of thread cutting teeth arranged and adapted to cut helical threads on a workpiece during turning of the latter and feeding thereof axially relative to the cutter, an end cutter at the remote ends of the two series, and a single end cutter axially between the series, each end cutter including an axially extending cutting edge of substantially greater width than said thread cutting teeth radially coextensive with the thread cutting teeth and which is arranged to cut transversely across the thread and form end faces on the ends of the threads.

FRITZ WALTERS.